Feb. 1, 1966 P. KLUWE ETAL 3,232,134
ROTARY PISTON ENGINE
Filed Jan. 25, 1962 2 Sheets-Sheet 1
FIG. 1
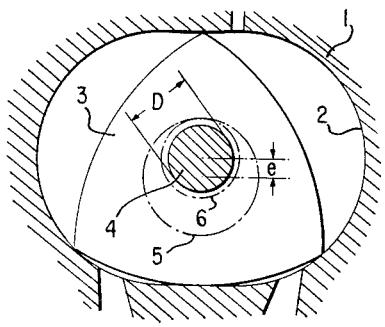
FIG. 2
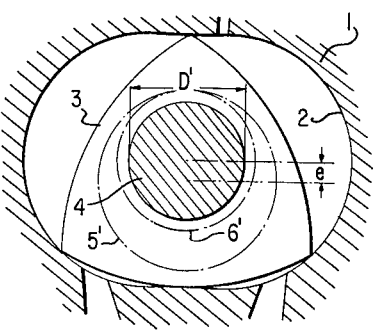
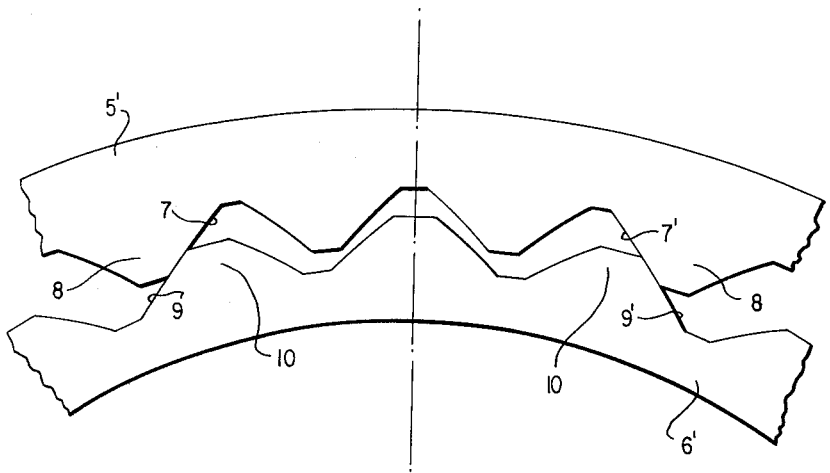
FIG. 3
INVENTORS.
PAUL KLUWE
REINHOLD HUBER
BY
Dicke and Craig
ATTORNEYS.

INVENTORS.
PAUL KLUWE
REINHOLD HUBER
BY
Dicke and Craig
ATTORNEYS.

United States Patent Office 3,232,134
Patented Feb. 1, 1966

3,232,134
ROTARY PISTON ENGINE
Paul Kluwe, Fellbach, Kreis Waiblingen, and Reinhold Huber, Esslingen-Zollberg, Germany, assignors to Daimler-Benz Aktiengesellschaft, Stuttgart-Unterturkheim, Germany
Filed Jan. 25, 1962, Ser. No. 168,677
Claims priority, application Germany, Jan. 31, 1961, D 35,301
4 Claims. (Cl. 74—462)

The present invention relates to a rotary piston engine, especially to a rotary piston internal combustion engine in which a piston forming the driving member is operatively connected with a driven or output shaft by way of a gear means in such a manner that the piston rotates eccentrically and at a pre-determined ratio to the output shaft, whereby the transmission or gear means consists of an internally toothed gear wheel rigidly secured concentrically to the piston and of an externally toothed gear wheel meshing with the internally toothed gear and rigidly secured concentrically to the housing.

With known rotary piston internal combustion engines which are equipped for example, with a two-arched cam track or surface provided within the housing and with a triangularly-shaped piston, the numbers of teeth of the externally toothed gear wheel to the internally toothed gear wheel must bear a ratio of 2 to 3 in order to achieve a proper operation of the engine in the intended manner. Since the externally toothed gear wheel is disposed concentrically ot the driven shaft, since the rotational speed ratio between the externally toothed gear and the internally toothed gear is given or predetermined and since furthermore the ratio of the generating radius for the configuration of the cam surface within the housing to the eccentricity of the piston bearing can be chosen only within predetermined limits, the diameter of the driven shaft is determined definitively as a result thereof; and more particularly, the width of the piston, conditioned by ignition forces cannot exceed a predetermined relationship to the diameter of the driven shaft.

It has now been discovered that this limitation in the determination of a large shaft diameter permitting a wide piston, or operation of the engine as diesel engine, can be removed by the fact that the tooth arrangement of the transmission in accordance with the present invention is constructed as a conventional or standard involute helical surface tooth arrangement with a pressure angle of, for example, $\alpha = 20°$, modified, however, to the extent that it is constructed with a positive sum of addendum coefficients which is larger by an exponent of ten than with the usual standard tooth constructions or gears. The limitation in the determination of a large shaft diameter can also be effectively removed by constructing the teeth of the transmission as involute helical surfaces with usual addendum modification and having, however, a pressure angle of $\alpha' =$ at least $60°$.

Accordingly, it is an object of the present invention to provide a rotary piston engine, particularly a rotary piston internal combustion engine, which eliminates the aforementioned shortcomings and inadequacies that are normally encountered with the prior art, especially as regards output shaft diameter.

It is another object of the present invention to provide a rotary piston internal combustion engine in which the teeth of the transmission are so constructed and arranged as to permit an increase in the output shaft of the engine to thereby enable use of this type of engine as a diesel engine.

A further object of the present invention resides in the provision of an internal combustion engine in which the engine shaft may be of such dimension as to be satisfactory for pistons of relatively large width.

These and other objects, features and advantages of the present invention will become more obvious from the following description when taken in connection with the accompanying drawing which shows, for purposes of illustration only, one embodiment in accordance with the present invention, and wherein FIGURE 1 is a schematic cross sectional view through a rotary piston internal combustion engine provided with a transmission between piston and the housing and/or output shaft constructed as known in the prior art and consisting of an internally toothed gear and an externally toothed gear;

FIGURE 2 is a schematic cross sectional view, similar to FIGURE 1, of a rotary piston internal combustion engine provided with a transmission constructed in accordance with the present invention;

FIGURE 3 is an enlarged partial view of the transmission in accordance with the present invention.

Figure 4:
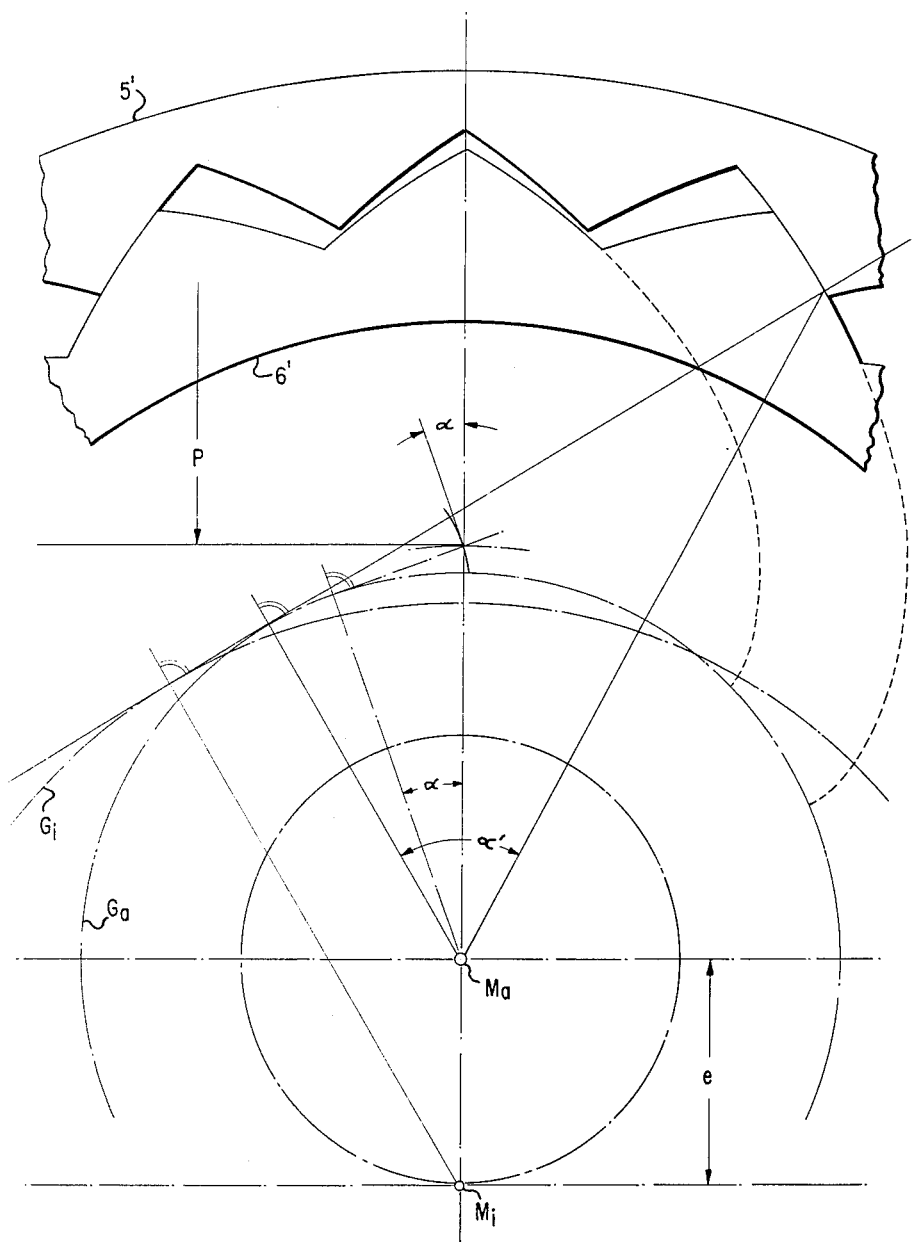
FIGURE 4 is a diagrammatic showing of the characteristic values of the transmission in accordance with the present invention as illustrated in FIGURE 2 herein.

Referring now to the drawing wherein like reference numerals are used throughout the various views to designate like parts, and more particularly to FIGURE 1 which illustrates a known prior art rotary piston internal combustion engine, reference numeral 1 designates therein a housing provided with a two-arched internal boundary 2 forming a cam surface and a triangularly-shaped piston 3 which is arranged with an eccentricity $e$ on an eccentric of the output shaft 4 concentrically supported within the housing 1. In order to assure proper operation of the internal combustion engine, the rotational speed of the piston 3 to the rotational speed of the output shaft 4 must bear a relation of 1 to 3. For that purpose, a transmission is provided which consists of the internally toothed gear 5, only schematically indicated, and of the externally toothed gear 6 also shown only schematically and meshing with the internally toothed gear 5. The internally toothed gear 5 is secured at one side of the piston 3 and is disposed concentrically thereto. The externally toothed gear 6 is secured at one side of the housing 1, is disposed centrally within the housing and is disposed concentric to the output shaft 4. The ratio of number of teeth between the gear wheels 5 and 6 must be 2 to 3 in this arrangement for proper operation thereof. The pitch diameter for the etxernally toothed gear 6 is already determined by this ratio of numbers of gear teeth and by the eccentricity $e$ to such an extent that with the usual conventional addendum modification the diameter D for the output shaft 4 can be constructed only of relatively small dimension. Such relatively small shaft diameter D as may be realized with the prior art constructions, however, satisfies all requirements concerning strength and rigidity only if the piston is provided with relatively small dimensions in the axial direction thereof and if several housings, disposed one behind the other, are not combined into a unit and the pistons in these housings are not supported on a common output shaft.

In order to make the diameter of the output shaft of the engine so large that several pistons may be supported on one and the same output shaft or that the pistons for purposes of achieving favorable combustion spaces for diesel operation can be made relatively wide, the present invention provides according to FIGURES 2 and 3 a transmission consisting of an internally toothed gear 5' and of an externally toothed gear 6' in which the teeth are constructed as ordinary involute helical surface teeth with a pressure angle $\alpha$ of, for example, 20°, however with a positive sum of addendum coefficients which is larger by a power of ten than the values which are considered normal for the sum of the addendum coefficients with usual tooth constructions. In order to achieve the same purpose, the tooth construction of the transmission may also be constructed as an involute helical surface with usual addendum modification, having, however, a pressure angle of $\alpha' =$ at least 60°.

In both cases, the externally toothed gear 6' obtains such a large free or clear internal diameter that output shaft 4 may be arranged therein, the diameter D' of which is considerably larger than with the use of a transmission having the usual prior-art involute helical tooth construction as illustrated in FIGURE 1. In all practical cases, a shaft diameter D' may be achieved which from a rigidity point of view may absorb without difficulties the ignition forces of pistons, the width of which corresponds to a value ten times the eccentricity thereof.

As shown more fully in FIGURE 3, the teeth of the internally toothed gear 5' and the teeth of the externally toothed gear 6' the numbers of which bear to each other a ratio of 3 to 2, mesh with each other in such a manner that there takes place, not a rolling off action as with the usual conventional involute helical surface tooth constructions but a mutual relative sliding movement. The lateral flanks 7 and 7' of the teeth 8 of the internally toothed gear 5' slide along the flanks 9 and 9' of the teeth 10 of the externally toothed gear 6'.

Whereas, with the usual teeth, to the greatest possible extent, no mutual relative sliding movement between the teeth is to take place, this feature and action is of great advantage with the transmission constructed in accordance with the present invention since the sliding operation or action has a stabilizing and damping effect on the piston movement by means of which no forces, or no significant forces to speak of, are transferred to the transmission.

In FIGURE 4 which shows characteristic values for the tooth construction between the internally toothed gear 5' and the externally toothed gear 6', reference character $M_a$ represents the center longitudinal axis of the externally toothed gear 6' centrally secured at the housing and provided with the base circle $G_a$. The base circle of the internally toothed gear 5', the center longitudinal axis $M_i$ of which is disposed away from the center longitudinal axis $M_a$ of the externally toothed gear wheel 6' by the amount of the eccentricity $e$, is designated by reference character $G_i$.

In order to obtain within the externally toothed gear 6' sufficient space for an output shaft with a diameter as large as possible, there may be used in the design of the tooth construction in accordance with the present invention either a conventional pressure angle $\alpha$ of, for example, 20° together with a positive addendum coefficient P which is larger by an exponent of 10 than with usual conventional teeth or, in the alternative, a pressure angle $\alpha'$ may be used which amounts to at least 60°.

While we have shown and described two embodiments in accordance with the present invention, it is understood that the same is not limited thereto, but is susceptible of many changes and modifications within the spirit and scope thereof, and we therefore do not wish to be limited to the details shown and described herein, but intend to cover all such changes and modifications as are encompassed by the scope of the appended claims.

We claim:

1. A rotary piston engine, especially rotary piston internal combustion engine, comprising housing means, driven shaft means, piston means disposed within said housing means and supported on said shaft means eccentrically with respect thereto and with the axis of said piston means extending substantially parallelly to the axis of said shaft means, and transmission means for imparting to said piston means a rotary movement about its own axis of rotation bearing a predetermined relationship to the rotary speed of said shaft means including internally toothed gear means operatively connected with said piston means for common rotation therewith and externally toothed gear means operatively connected with said housing means, said externally toothed gear means meshing with said internally toothed gear means, said gear means having an involute tooth construction with a predetermined addendum modification and a predetermined pressure angle, one of the two characteristics consisting of the sum of the addendum coefficients and of the pressure angle being of conventional value and the other having a value differing from the conventional value, said differing value in case of the pressure angle amounting to a pressure angle of at least 60° and in the case of the addendum coefficients being a positive sum of coefficients which is larger by an exponent of 10 than with conventional tooth constructions.

2. A rotary piston engine, especially rotary piston internal combustion engine, comprising housing means, driven shaft means, piston means disposed within said housing means and supported on said shaft means eccentrically with respect thereto and with the axis of said piston means extending substantially parallelly to the axis of said shaft means, and transmission means for imparting to said piston means a rotary movement about its own axis of rotation bearing a predetermined relationship to the rotary speed of said shaft means including internally toothed gear means operatively connected with said piston means for common rotation therewith and externally toothed gear means operatively connected with said housing means, said externally toothed gear means meshing with said internally toothed gear means, said gear means having an involute tooth construction with a predetermined addendum modification and a predetermined pressure angle, the sum of the addendum coefficient being of conventional value and the pressure angle amounting to at least 60°.

3. A rotary piston engine, especially rotary piston internal combustion engine comprising housing means, driven shaft means, piston means disposed within said housing means and supported on said shaft means eccentrically with respect thereto and with the axis of said piston means extending substantially parallelly to the axis of said shaft means, and transmission means for imparting to said piston means a rotary movement about its own axis of rotation bearing a predetermined relationship to the rotary speed of said shaft means including internally toothed gear means operatively connected with said piston means for common rotation therewith and externally toothed gear means operatively connected with said housing means, said externally toothed gear means meshing with said internally toothed gear means, said gear means having an involute tooth construction with pressure angle of conventional value and with a positive sum of addenum coefficients which is larger by an exponent of 10 than with conventional tooth constructions.

4. In a rotary piston engine, especially in a rotary piston internal combustion engine in which a piston is supported within a housing on a driven shaft essentially with respect thereto and with the axis of the piston extending substantially parallelly to the axis of the output shaft, and in which said piston is rotated about its own axis of rotation at a predetermined ratio to the rotational speed of the output shaft by a transmission which consists of an internally toothed gear rigid at the piston and of an internally toothed gear rigid at the housing and meshing with said externally toothed gear, the improvement essentially consisting of an involute helical surface tooth construction for the gears of the transmission in which one of two characteristics of the involute tooth construction consisting of pressure angle and of sum of addendum coefficients differs from conventional values, the differing value for the pressure angle being at least 60° and the differing value for the sum of the addendum coefficient being positive and larger by a power of 10 than with conventional standard involute tooth constructions.

References Cited by the Examiner

UNITED STATES PATENTS 2,666,336   1/1954   Hill et al. _____ 74—462
3,007,460   11/1961  Bentele et al.

DON A. WAITE, *Primary Examiner.*

BROUGHTON G. DURHAM, *Examiner.*